April 10, 1956 W. W. DAVIS 2,741,698
SQUARE WAVE PULSE GENERATOR
Filed June 16, 1952
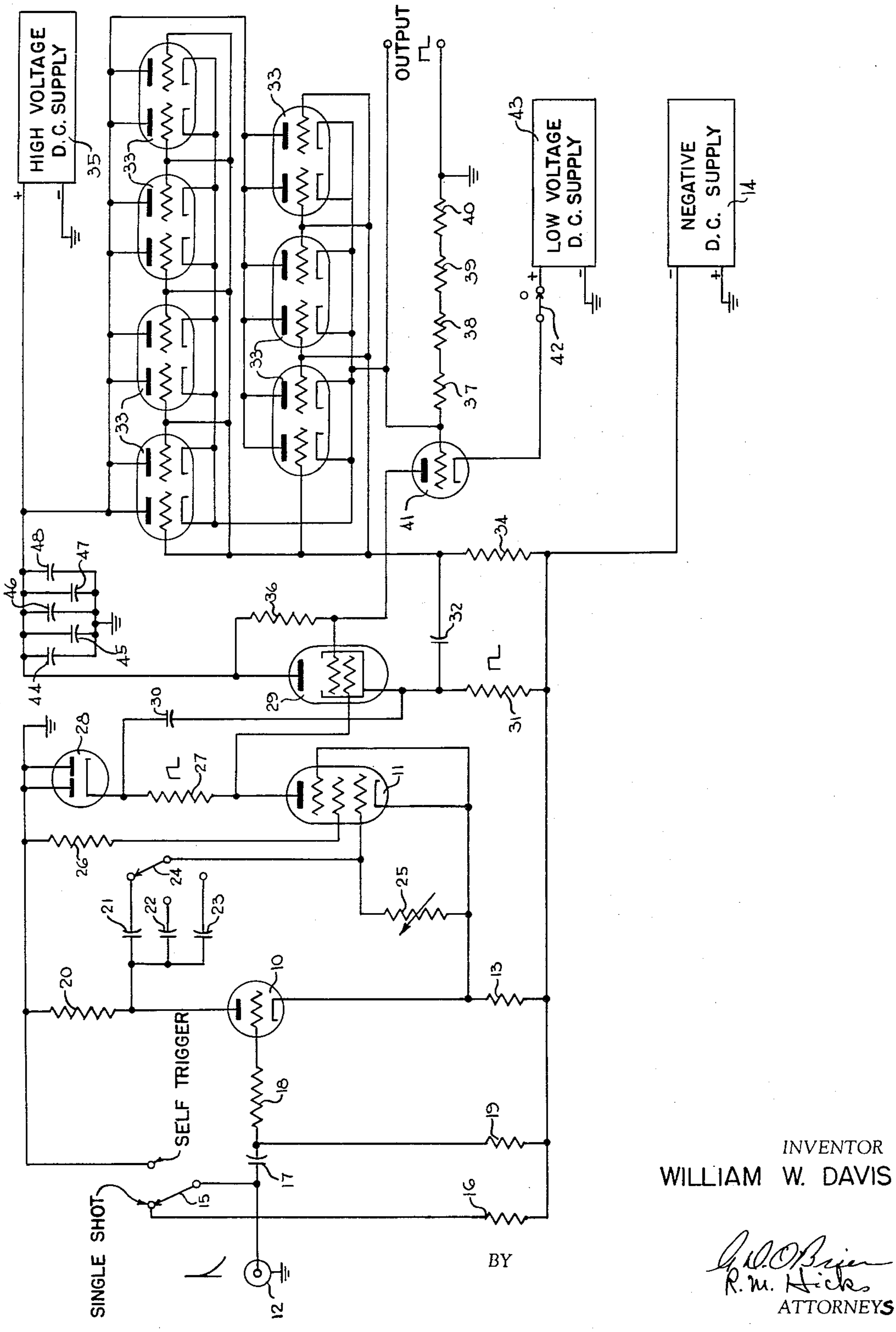
INVENTOR
WILLIAM W. DAVIS
BY
G. O. O'Brien
R. M. Hicks
ATTORNEYS United States Patent Office 2,741,698

Patented Apr. 10, 1956

2,741,698

SQUARE WAVE PULSE GENERATOR

William W. Davis, Bethesda, Md.

Application June 16, 1952, Serial No. 293,875

8 Claims. (Cl. 250—27)

(Granted under Title 35, U. S. Code (1952), sec. 266)

The invention described herein may be manufactured and used by or for the Government of the United States of America for governmental purposes without the payment of any royalties thereon or therefor.

This invention relates to square wave pulse generators and more particularly to a triggered multivibrator and amplifier circuit for producing a rectangular wave and for controlling the pulse length, pulse amplitude, and repetition frequency of the generated rectangular wave.

In the generation of square waves for electronic applications it is highly desirable that a pulse be produced having very sharp leading and trailing edges with a non-varying flat top therebetween. The generator of such a square wave should have a low output impedance so that the loading of the output circuit of the generator will not alter the shape of the wave produced, and the square wave cycle generated should be flexible with respect to pulse length, pulse amplitude and repetition frequency. Prior attempts to incorporate these desirable features in a square wave generator have involved the use of thyratron circuits which generally provide low output impedances and high voltages and currents, but which also involve the use of large quantities of power and do not provide the required flexibility of pulse length. Single-triggered multivibrator circuits have also been used to generate these waves, however, difficulty has been encountered in attaining a low output impedance and at the same time producing a sharply squared wave.

The present invention comprises a pulse generator which includes a single-triggered multivibrator and amplifier in which the pulse length is completely adjustable over a wide range and in which the recovery time of the multivibrator timing circuit is reduced to a minimum to enable the multivibrator to be triggered at a rapid rate. The output stage of the pulse generator is designed to provide an effectively reduced output impedance by means of a plurality of parallel connected vacuum tubes functioning as a cathode follower circuit, and includes a regulating feed back loop to maintain a flat top of the square wave output.

Accordingly, it is an object of the present invention to provide a sharply squared output wave by means of a multivibrator circuit and amplifier having moderate power requirements.

Another object is to provide a square wave generator having an extremely low output impedance.

A further object is to provide a rectangular wave generator which produces pulses having fast rise and fall times and a flat top shape.

A still further object of the invention is to provide a rectangular wave generator having a flexible pulse length, pulse amplitude and repetition frequency.

Another object is to provide a square wave generator in which the output is regulated during the square wave cycle to provide a flat wave shape output.

Another object is to provide a rectangular pulse output of high current and high voltage without the use of excessively large power supply circuits.

Other objects and many of the attendant advantages of this invention will be readily appreciated as the same becomes better understood by reference to the following detailed description when considered in connection with the accompanying drawing which shows a schematic diagram of a square wave pulse generator illustrating a preferred embodiment of the invention.

Referring now to the drawing, there is shown a vacuum tube 10 which, operating with a pentode 11 and associated circuitry, forms a flip flop multivibrator designed to be triggered either by an external pulse applied at an input jack 12 or to be self-triggered. The cathodes of the triode 10 and the pentode 11 are connected together to a cathode bias resistor 13 one end of which is connected to a negative D. C. voltage supply 14. The use of a cathode resistor of proper value for the triode 10 provides suitable bias for the tube and enables the multivibrator to operate without a negative grid bias supply. The bias developed across the cathode resistor adjusts itself to the circuit voltages and components being used, thus rendering the circuit less sensitive to changes in operating conditions and improving the stability of the multivibrator.

A switch 15 in the input circuit to the triode enables the circuit to function as an externally triggered single-shot multivibrator when the switch is in the left position as shown, or causes the circuit to operate as a self-triggered flip flop multivibrator with the switch in the right position. Considering first the operation of the circuit as a single-shot externally triggered multivibrator, the input pulse, which consists of a positive triggering pulse, is developed across a resistor 16 through the switch 15 in its left position. The trigger pulse is fed through an input capacitor 17 and a grid current limiting resistor 18 to the grid of the triode 10. A grid leak resistor 19 provides a D. C. return for the grid of the triode to the low side of the negative voltage supply source. The plate of the triode is returned to the high side of the negative D. C. supply source through a plate load resistor 20 across which the output signal of the triode is developed. The signal appearing at the plate of the triode may be coupled to the grid of the pentode 11 through a capacitor 21, a capacitor 22, or a capacitor 23, the particular coupling capacitor selected being dependent upon the position of a selector switch 24. The signal fed to the grid of the pentode 11 is developed across a potentiometer 25 connected between the grid and cathode of the pentode, and the screen grid of the pentode is returned to the high side of the negative voltage supply through a screen dropping resistor 26. The output signal of the pentode 11 is developed across a plate load resistor 27 connected to the cathode of a diode 28, the plates of which are connected together to the high side of the negative voltage supply 14.

Prior to the insertion of an input signal at the jack 12 the pentode 11 is normally conducting due to the fact that there is no difference of potential between its cathode and grid. The plate and screen currents of the pentode are returned through the cathode bias resistor 13, whereby the positive potential developed across this resistor and applied to the cathode of the triode 10 is of sufficient magnitude to cut off the triode. Upon the application of a positive input signal to the grid of the triode, this tube, which was normally non-conducting, begins to conduct, whereby the potential at its plate decreases. This decreasing signal is coupled to the grid of the pentode to decrease the plate current therethrough and thus decrease the current through the cathode bias resistor 13 which controls the bias on the triode. The cumulative effect of rapidly decreasing bias on the triode and rapidly increasing bias on the pentode causes the multivibrator to flip over in a conventional manner thus producing a sharply decreasing voltage at the plate of the triode and a sharply increasing voltage at the plate of the pentode. The triode is almost instantaneously driven to plate saturation and the capacitor 21, which has been charged during the interval in which the triode was non-conducting, begins to discharge through the conducting triode and the potentiometer 25. After a predetermined interval, controlled by the value of the capacitor 21 and the resistance of the potentiometer 25, the voltage appearing at the grid of the pentode 11 reaches a point above the cut off value of the tube and the pentode begins to conduct. Plate and screen current from the pentode again begin to flow through the cathode bias resistor 13 to increase the bias on the triode, thus producing a sharply increasing voltage at the plate of the triode and a sharply decreasing voltage at the plate of the pentode. The interval during which the pentode 11 is cut off, which is the pulse length of the generated rectangular wave, may be adjusted in steps by means of the switch 24 which controls the amount of capacitance interconnecting the plate of the triode and the grid of the pentode. A fine adjustment for controlling the RC time constant between these stepped positions to thus control the pulse length is provided by the potentiometer 25. Thus a rectangular wave having a pulse length which is completely adjustable over a wide range is produced at the plate of the pentode across the resistance 27.

The pentode 11, the diode 28, and a cathode follower 29 provide a boot strap amplifier which causes the amplitude of the rectangular wave appearing across the plate load resistor 27 to attain a high value. The voltage appearing at the plate of the pentode 11 is coupled through the cathode follower 29 and a large coupling capacitor 30 to the high voltage end of the plate load resistor 27. The diode 28 maintains the voltage at the high voltage end of the plate load resistor at a value approximately equal to the high side of the negative voltage supply between generated pulses, during which the pentode 11 is conducting. The diode also permits the voltage appearing at the high side of the plate load resistor 27 to rise substantially the same amount as the voltage rise occurring at the plate of the pentode during the period of the pentode 11 when the square wave pulse is generated. Thus when the pentode 11 is cut off the rising voltage appearing at its plate is fed directly to the grid of the cathode follower causing that tube to conduct and produce a signal across a cathode load resistor 31 in the cathode circuit of the cathode follower. The signal appearing at the cathode of the cathode follower 29 is applied through the coupling capacitor 30 to the high side of the plate load resistor 27 so that the voltage at this point rises at approximately the same rate as the voltage at the plate of the pentode. If the gain of the cathode follower were exactly unity these two voltage changes at the high and low side of the plate load resistor would be exactly the same, however, the gain of the cathode follower is somewhat less than one so that these voltages are only approximately equal.

At the termination of the rectangular pulse when the pentode 11 again begins to conduct, the voltage at its plate begins to decrease and this decreasing signal is applied to the grid of the cathode follower to cause the signal appearing across the cathode load resistor 31 to decrease. This decreasing signal is again applied to the high side of the plate load resistor 27 through the coupling capacitor 30 so that the voltage variations at the high side of the plate load resistor 27 through the coupling capacitor 30 so that the voltage variations at the high side of the plate load resistor again tend to follow the voltage variations at the plate of the pentode.

In the design of the multivibrator and boot strap amplifier circuits, to attain a fast transition time and thus produce sharp trailing and leading edges of the wave form, it is necessary that the loading capacitances be small and the peak currents through them large. Thus, care must be taken to keep the stray capacitances of the tubes and wiring at a minimum and, hence, the circuit which is fed by the multivibrator must present a low capacitance to the output circuit so that the use of a cathode follower becomes desirable. The multivibrator circuit should be designed using high transconductance tubes which provide a large amount of plate current for a small change in grid voltage and the plate resistors of the multivibrator tubes should be as small as possible so that the tubes can be operated at high currents to produce an output wave of substantial amplitude with sharp trailing and leading edges.

When the switch 15 in the input circuit of the multivibrator is moved to the right position in response to some circuit condition such as by the energization of a relay or the like a square wave of predetermined duration is produced. At the instant the switch is thrown a pulse of voltage from the high side of the negative voltage supply is applied to the grid of the normally non-conducting triode 10 through the coupling capacitor 17. When the positive pulse is applied from the power supply the triode 10 begins to conduct and a square wave is generated in exactly the same manner as has been explained with the application of a positive external trigger pulse.

The output of the multivibrator and boot strap amplifier circuits are taken across the cathode load resistor 31 and are applied through a coupling capacitor 32 to the grids of a plurality of parallel connected duo triodes 33. The grids of the duo triodes 33, which are connected together, are returned to the negative voltage supply through a grid leak resistor 34. The plates of the duo triodes, which are also connected together, are returned directly to the high side of a high voltage D. C. supply 35 which also furnishes the plate supply voltage for the cathode follower 29. The screen grid of the cathode follower 29 is returned to the high side of the high voltage supply through a screen dropping resistor 36. The cathodes of the duo triodes 33, which are connected together, are returned to ground through a plurality of series connected cathode load resistors 37, 38, 39 and 40 so that when the cathode follower 29 is non-conducting during the non-conducting portion of the pentode 11 a large difference of potential exists between the grids and cathodes of the duo triodes 33 to maintain these tubes well below cut off.

When the rectangular wave from the cathode follower 29 is applied to the grids of the duo triodes the grid potential is raised sufficient to overcome the negative bias and permit the duo triodes to operate in a region at approximately the zero bias operating point of their characteristic curves. Therefore, a large current flow is attained for the duration of the square wave pulse, the amount of current flow being a direct result of the number of duo triodes connected in parallel so that this current may be increased by increasing the number of parallel connected tubes. The conduction of the duo triodes causes a square wave to appear across the cathode load resistors 37 through 40. This signal serves as the output of the square wave pulse generator and is also fed to the grid of a regulating triode 41, which may be one half of a duo triode the other half of which may be the triode 10 in the multivibrator circuit. The cathode of the regulating triode is connected through a switch 42 to the high side of a low voltage D. C. supply 43, the value of which may be approximately equal to that of the negative D. C. supply and thus to the bias on the grids of the duo triodes. The plate of the regulating triode 41 is connected directly to the screen grid of the cathode follower 29 so that the plate current of the regulating triode flows through the screen dropping resistor 36 to the high voltage D. C. supply 35.

The rectangular wave output of the cathode follower 29 will have a pulse amplitude approximately equal to the value of the negative D. C. supply and to the value of the low voltage D. C. supply. The purpose of the duo triodes 33 and the regulating triode 41 is to maintain the amplitude of the rectangular pulse output at this value for the duration of the pulse to thus produce a flat top wave. In addition to this function the output circuit also serves to reduce the output impedance of the square wave generator to a very low value, which is of utmost importance in the generation of a sharply squared wave, inasmuch as a generating circuit having a large internal impedance will cause the output wave form to depend in both shape and amplitude upon the nature of the load impedance across which it is to be taken. The production of a flat top square wave is accomplished by feeding back a portion of the square wave output through the regulating triode to the screen of the cathode follower 29 to correct for any tendency of the output signal to deviate from its square top value. If the signal at the cathodes of the duo triodes tends to increase above its flat top value, which is approximately the value of the low voltage D. C. supply, an increase in the plate current of the regulating triode 41 will result, thus causing an increase in the voltage drop across the screen dropping resistor 36. Hence the screen voltage on the cathode follower is reduced to thus decrease the current flow through the cathode load resistor 31 and decrease the signal applied to the grids of the duo triodes, whereby the signal appearing at the cathode of the duo triodes is returned to its flat top value. If the output signal tends to decrease below the flat top value the signal applied to the grid of the regulating triode 41 will be decreased and the plate current of this triode will, therefore, drop causing an increase in potential at the screen of the cathode follower 29. An increase in the signal appearing across the cathode load resistor 31 and, consequently, the signal applied to the grids of the duo triodes, results so that the signal at the cathodes of the duo triodes is increased to the flat top value. The regulating feed-back loop tends to compensate for all changes in output regardless of their cause and consequently such variations as those due to change in load, cathode fatigue, cathode heating, power supply changes due to either ripple or transients, variation in tube characteristics, and drive voltage fluctuations are corrected by the regulating circuit.

If regulation is not desired, elaborate changes in circuitry are unnecessary since the switch 42 connecting the cathode of the regulating triode 41 to the low voltage D. C. supply 43 may be thrown to the open position whereby the cathode of the triode is left floating. When the switch 42 is in the open position, however, the output impedance of the square wave generator is increased to some extent. The high side of the high voltage D. C. supply 35 is bypassed to ground through a plurality of very large parallel connected capacitors 44 through 48 inclusive. The number of capacitors used and their value is determined by the space available, the duration of the rectangular wave pulse, and the output current during the pulse period.

The tube types illustrated are in no sense critical since the cultivibrator may be composed of any sharp cut off tubes which produce sufficient current to generate the required square wave. The cathode follower tube 29 may be any tetrode or pentode having characteristics for producing the desired square wave in the cathode circuit and the functions of the regulating triode 41 may be performed by any type tube which produces a plate current considerably larger than the screen current which is to be regulated.

From the foregoing it will be apparent that the pentode of the multivibrator performs a dual function. Its input circuit comprises a portion of the multivibrator circuit proper while its output circuit and its characteristic pentode action comprise a portion of the boot strap amplifier circuit. More specifically, tubes 10 and 11 and the interconnecting circuits comprise a multivibrator. Tubes 11, 28, and 29 comprise a boot strap amplifier. Tube 11, it will be understood, is normally conducting. By making use of this tube to perform a dual function, the standby current requirement on the negative D. C. supply 14 is cut approximately in half.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. In a pulse generator, a multivibrator for producing a substantially rectangular wave, amplifying circuit including the output of said multivibrator for raising the amplitude of the substantially rectangular wave, said amplifier including an electronic tube having at least a cathode, a control grid, a screen grid, and a plate, a plurality of parallel connected tubes driven by the signal output of said amplifier, an output load circuit connected in the cathode circuit of said parallel connected tubes for producing a sharp rectangular wave having a flat top of predetermined amplitude, and a regulating circuit including load means for said screen grid, said regulating circuit being driven by the signal of the output circuit for causing the screen potential of said electronic tube to vary in phase opposition to any change in output signal from the predetermined flat top amplitude whereby a sharp rectangular wave having a flat top is produced.

2. In a pulse generator, a multivibrator for producing a substantial rectangular wave, a boot strap amplifying circuit in the output of said multivibrator for raising the amplitude of the substantially rectangular wave, said boot strap amplifier including an electronic tube having at least a cathode, a control grid, a screen grid, and a plate, a screen load for said tube, a plurality of parallel connected tubes driven by the signal output of said boot strap amplifier, an output load circuit connected in the cathode circuit of said parallel connected tubes for producing a sharp rectangular wave having a flat top of predetermined amplitude, and a regulating circuit driven by the signal of the output circuit for producing a current in response to deviations of the output signal from its predetermined flat top amplitude, said current flowing through the screen load of said electronic tube to cause the screen potential on the screen grid of said tube to be varied in phase opposition to the deviation of the output signal from the flat top value whereby a sharp rectangular wave having a flat top is produced at the output circuit.

3. In a triggered pulse generator for producing a sharp rectangular wave, a triggered multivibrator for producing a substantially rectangular wave for each input trigger pulse, a boot strap amplifying circuit in the output of said multivibrator for raising the amplitude of the substantially rectangular wave, said boot strap amplifier including an electronic tube having at least a cathode, a control grid, a screen grid and a plate, a screen load for the screen circuit of said tube, a plurality of parallel connected tubes driven by the signal output of said boot strap amplifier, an output load circuit connected in the cathode circuit of said parallel connected tubes for producing a sharp rectangular wave having a flat top of predetermined amplitude, and a regulating tube including at least a plate, a control grid, and a cathode, the control grid of said regulating tube being connected to the output load circuit so that the plate current through the regulating tube is dependent on the amplitude of the output signal, the plate of said regulating tube being connected to the screen of said electronic tube so that the plate current of the regulating tube flows through the screen load of said electronic tube to cause the screen potential on the electronic tube to be varied in phase opposition to any change in output signal from the predetermined flat top amplitude whereby a sharp rectangular pulse having a flat top is produced at the output circuit.

4. A triggered pulse generator for producing a sharp rectangular wave which comprises a triggered multivibrator for producing a substantially rectangular wave for each input trigger pulse, means for adjusting the pulse width of the substantially rectangular wave form, a boot strap amplifying circuit in the output of said multivibrator for raising the amplitude of the substantially rectangular wave, said boot strap amplifier including an electronic tube having at least a cathode, a control grid, a screen grid, and a plate, a screen load for the screen circuit of said tube, a cathode load in the cathode circuit of said electronic tube whereby the plate current of said tube produces a rectangular wave across the cathode load, a plurality of parallel connected tubes driven by the signal across said cathode load, an output load circuit connected in the cathode circuit of said parallel tubes for producing a sharp rectangular wave having a flat top of predetermined amplitude, and a regulating tube including at least a plate, a control grid, and a cathode, the control grid of said regulating tube being connected to the output load circuit so that the plate current through the regulating tube is dependent upon the amplitude of the output signal, the plate of said regulating tube being connected to the screen of said electronic tube so that the plate current of the regulating tube flows through the screen load of said electronic tube to cause the screen potential on the electronic tube to be varied in phase opposition to any change in output signal from the predetermined flat top amplitude whereby a sharp rectangular pulse having a flat top is produced at the output circuit.

5. In a pulse generator, a multivibrator for producing a substantially rectangular wave including means for varying the pulse width, a boot strap amplifying circuit in the output of said multivibrator including said means as a part of the amplifying circuit for raising the amplitude of the substantially rectangular wave, said boot strap amplifier including an electronic valve having at least a cathode, a control grid, a screen grid, and an anode, a screen load for said valve, an output circuit driven by said amplifier so as to produce a high current output wave and a regulating circuit connected to the screen load and driven by variations in the signal output of said output circuit for producing a current in response to deviations of the output signal from its predetermined flat top amplitude, said current flowing through the screen load of said electronic valve to cause the potential on the screen grid of said valve to be varied in phase opposition to the deviation of the output signal from the flat top value whereby a sharp rectangular wave having a flat top is produced at the output circuit.

6. In a triggered pulse generator for producing a sharp rectangular wave, a triggered multivibrator for producing a substantially rectangular wave for each input trigger pulse, a boot strap amplifying circuit in the output of said multivibrator for raising the amplitude of the substantially rectangular wave, said boot strap amplifier including an electronic valve having at least a cathode, an anode, a control grid and a screen grid, a screen load for the screen circuit of said valve, an output circuit driven by said amplifier so as to produce a high current output wave and a regulating valve including at least a cathode, an anode, and a control grid, the control grid of said regulating valve being connected to the output circuit so that the plate current through the regulating tube is dependent on the amplitude of the output signal, the anode of said regulating tube being connected to the screen of said electronic valve so that the plate current of the regulating tube flows through the screen load of said electronic valve to cause the screen potential on the electronic valve to be varied in phase opposition to any change in the output signal from the predetermined flat top amplitude whereby a sharp rectangular pulse having a flat top is produced at the output circuit.

7. In a pulse generator, a multivibrator comprising a first normally non-conducting electronic valve and a second normally conducting electronic valve; said electronic valves each having at least a plate, a grid and a cathode; a resistance-capacitance circuit connected between the plate of said first valve and the grid cathode circuit of said second valve; said resistance of said resistance capacitance circuit being a variable resistance to provide adjustment of the pulse length produced by the multivibrator; a third electronic valve having a cathode, a grid, a screen grid, and a plate; a cathode loaded amplifier including said second and third electron valves for amplifying the output of the multivibrator; a current amplifying circuit driven by the output of said cathode loaded amplifier and providing a pulsed output for the pulse generator; a load circuit for said screen of said third valve; means driven by variations in said output current for applying the voltage variations to said screen of said third valve in phase opposition to the variations in the voltage of said output of the pulse generator.

8. A pulse generator as claimed in claim 7 in which the last named means comprises an electron valve having a plate, a grid, and a cathode; said grid of said last named valve being connected to be driven by voltage variations in the output of said current amplifying device; said plate of said last named valve being connected through said load and screen grid of said third valve to a high voltage source.

References Cited in the file of this patent

UNITED STATES PATENTS

| | | |
|---|---|---|
| 2,426,256 | Zenor | Aug. 26, 1947 |
| 2,435,331 | Street | Feb. 3, 1948 |
| 2,532,534 | Bell, Jr. | Dec. 5, 1950 |
| 2,554,172 | Custin | May 22, 1951 |
| 2,562,792 | James | July 31, 1951 |
| 2,575,107 | Hobbs et al. | Nov. 13, 1951 |
| 2,666,815 | Chapin | Jan. 19, 1954 |